US008213642B2

(12) United States Patent
Natsume et al.

(10) Patent No.: US 8,213,642 B2
(45) Date of Patent: Jul. 3, 2012

(54) SLIDE MANIPULATION DEVICE AND SLIDE CONTROL CONSOLE

(75) Inventors: Yoshihiro Natsume, Hamamatsu (JP); Ryuichi Izumi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 679 days.

(21) Appl. No.: 12/410,382

(22) Filed: Mar. 24, 2009

(65) Prior Publication Data

US 2009/0241759 A1 Oct. 1, 2009

(30) Foreign Application Priority Data

Mar. 25, 2008 (JP) ................................ 2008-079381
Jan. 13, 2009 (JP) ................................ 2009-004800

(51) Int. Cl.
*H04B 1/00* (2006.01)

(52) U.S. Cl. ......................................... 381/119; 700/94

(58) Field of Classification Search .................. 381/119; 700/94

See application file for complete search history.

(56) References Cited

FOREIGN PATENT DOCUMENTS

JP 2002-008907 1/2002
JP 2004-093942 3/2004
JP 2007-134646 5/2007

*Primary Examiner* — Douglas Menz

(74) *Attorney, Agent, or Firm* — Morrison & Foerster LLP

(57) ABSTRACT

A slide manipulation device is mountable in a manipulator panel and includes a manipulator, a frame configured to slidably support the manipulator, and a circuit board. The frame has an opposing part facing the inside of the manipulation panel when the frame is mounted to the manipulation panel, the frame extending in a direction intersecting the opposing part and extending in a slide direction of the manipulator. The manipulator extends outward from the interior of the frame and is slidable in the slide direction to indicate a parameter for use in an electronic equipment. The circuit board is disposed at the outside of the frame along the extending direction of the frame, and is mounted to the frame for carrying out overall control to signalize a parameter set by the manipulator and to transmit the signalized parameter to the electronic equipment, and otherwise to receive the parameter from the electronic equipment and to slide the manipulator in response to the received parameter.

9 Claims, 11 Drawing Sheets

SLIDE MANIPULATION DEVICE AND SLIDE CONTROL CONSOLE

BACKGROUND OF THE INVENTION

1. Technical Field of the Invention

The present invention relates to a slide manipulation device, such as a fader or a mixer, to set a parameter of an electronic musical instrument or a sound facility through a sliding movement of a manipulator, and relates to a slide control console including a plurality of slide manipulation devices.

2. Description of the Related Art

A fader is widely used as such a slide manipulation device. A mixer including a plurality of faders is widely used as a slide control console. The fader is provided for setting control parameters, such as sound volume, sound quality, and sound effect, in response to the slide position of a manipulator, such as a knob, mounted at the upper part of a box-shaped main body, through the sliding movement of the manipulator. The sliding movement of the manipulator may be performed manually or in a motor-driven manner. An electronic musical instrument or a sound facility performs various kinds of control based on control signals transmitted from the faders. For this reason, each of the faders is connected to a circuit board having electronic parts or circuits to set and transmit parameters. A mixer includes a plurality of faders mounted therein. According to circumstances, the mixer may include various sound control parts. The mixer is used to control various sound parameters by manipulators disposed at a panel surface of the mixer.

A conventional fader includes a board disposed in a box-shaped main body. For example, a fader disclosed in Patent Reference 1 is constructed in a structure in which a mover coupled to a knob is received in the box-shaped main body, and the board is mounted to the inside surface of a side wall of the main body. Also, a slide manipulation device disclosed in Patent Reference 2 is constructed in a structure in which a board is mounted to a gondola configured to slide in a box-shaped main body. A device disclosed in Patent Reference 3 is constructed in a structure in which boards are individually mounted to a panel of a mixer in the vicinity of faders mounted to the mixer.

[Patent Reference 1] Japanese Patent Application Publication No. 2002-8907 (Paragraph 0013)

[Patent Reference 2] Japanese Patent Application Publication No. 2007-134646 (Paragraph 0042)

[Patent Reference 3] Japanese Patent Publication No. 3716822 (Paragraphs 0014 and 0022)

However, the above-described fader has a problem in view of mounting dimension and function of the fader. That is, in the device disclosed in Patent Reference 1, the board is mounted to the inside surface of the side wall of the main body of the fader, with the result that heat generated from the board easily accumulates in the main body. In order to avoid this problem, therefore, it is required to increase the capacity of the main body of the fader, in particular the dimension of the board in the thickness direction of the board.

The manipulation surface above the fader is generally elongated in the slide direction of the manipulator. Therefore, the increase in dimension of the board in the thickness direction of the board results the increase in the direction (the lateral direction of the fader) perpendicular to the longitudinal direction of the board. In a structure in which a plurality of faders are included as in the mixer, the total dimension considerably increases when the dimension of the respective faders increases in the lateral direction of the respective faders.

Also, in the device disclosed in Patent Reference 2, the board is mounted to the gondola configured to slide in the main body of the fader, with the result that the dimension of the board is limited by the gondola, and therefore, the function of a circuit board is inevitably restrained. On the other hand, the construction of the board in a multiple-layer structure is required to increase the area of the board and thus improve the function of the board circuit, which leads to the increase in dimension of the main body of the fader, in which the board is received, in the lateral direction of the main body of the fader.

In the device disclosed in Patent Reference 3, the boards are individually mounted to the panel of the mixer while being separated from the faders, with the result that spaces for the coupling between the faders and the panel and the coupling between the boards and the panel are required, and therefore, the mounting distance of each fader in the lateral direction increases.

Therefore, even in any cases, the increase in space necessary to accommodate the fader and thus the increase in size of the mixer are inevitably caused. This problem is similarly caused in another slide manipulation device to set a parameter of an electronic musical instrument or a sound facility through the sliding movement of a manipulator. Furthermore, This problem is also caused in a slide control console including such slide manipulation devices.

SUMMARY OF THE INVENTION

The present invention has been made in view of the above problems caused by the conventional art, and it is an object of the present invention to provide a slide manipulation device having a large board area and a small disposition space in the lateral direction, and a slide control console including the slide manipulation device.

In order to accomplish the above objects, the present invention provides a slide manipulation device 10 including a manipulator (a connection rod 23 and a knob 24) and a frame 25 configured to slidably support the manipulator, wherein the frame has an opposing part 214*t* facing the inside of a manipulation panel 2 when the frame is mounted to the manipulation panel, the frame extending in a direction T intersecting the opposing part 214*t* and in a slide direction S of the manipulator, the manipulator extends outward (in a direction indicated by an arrow G) from the interior of the frame 25, and is slidable in the slide direction to indicate a parameter for use in an electronic equipment, and the slide manipulation device further includes a board 40 disposed at the outside of the frame 25 along the extending direction of the frame, such that the board is mounted to the frame 25 for carrying out overall control, to signalize a parameter set by the manipulator and to transmit the signalized parameter to the electronic equipment, and otherwise to receive the parameter from the electronic equipment and to slide the manipulator in response to the received parameter.

In order to accomplish the above objects, the present invention further provides a slide manipulation device including a setting main body 20A having a manipulator (a connection rod 23 and a knob 24) and a frame 25 configured to slidably support the manipulator, a board 40A configured to carry out overall control to signalize a parameter set by the manipulator and to transmit the signalized parameter to the electronic equipment, and otherwise to receive the parameter from the electronic equipment and to slide the manipulator in response to the received parameter, and a mounting unit 30 configured to mount the setting main body 20A and the board 40A to a manipulation panel 2 of a slide control console 1, wherein the mounting unit 30 (a planer member 61, opposing parts 62*t* and 214*t*, and a panel fixing part 64) includes a planer member 61, an opposing part 62*t* and 214*t* facing the inside of the manipulation panel 2 when the mounting unit is mounted to the manipulation panel, and a panel fixing part 64 configured to fix the planer member 61 to the inside of the manipulation panel of the slide control console 1, the setting main body 20A extends in a direction T intersecting the opposing part 62*t* and 214*t* and in a slide direction S of the manipulator, the manipulator extends outward (in a direction indicated by an arrow G) from the interior of the frame 25, and the mounting unit 30 retains the setting main body 20A at one side of the planer member 61 and the board 40A at the other side of the planer member 61.

In order to accomplish the above objects, the present invention further provides a slide control console including a plurality of the slide manipulation devices, wherein the slide manipulation devices are mounted to the manipulation panel while being arranged in a row.

In order to accomplish the above objects, the present invention further provides a fader apparatus for use in an audio mixer, comprising: a fader main body having a manipulator for indicating setting parameter information associated to a sliding movement of the manipulator; a mount unit that mounts the fader main body to a panel of the audio mixer; and a circuit board that carries out overall control of transmitting and receiving signals to and from an electronic equipment including the audio mixer for exchanging the setting parameter information, wherein the fader main body, the mount unit and the circuit board are integrally assembled into an assembly, and wherein the mount unit has a fitting part facing the panel for mounting the circuit body to the mount unit vertically with the fitting part.

(1) In the slide manipulation device according to the present invention, a frame, configured to slidably support a manipulator, has an opposing part facing the inside of a manipulation panel when the frame is mounted to the manipulation panel, the frame extending in a direction intersecting the opposing part and in a slide direction of the manipulator, the manipulator extends outward from the interior of the frame, and a circuit board configured to signalize a parameter set by the manipulator and configured to transmit the signalized parameter is disposed at the outside of the frame along the longitudinal direction of the frame such that the board is mounted to the frame. Since the board is disposed at the outside of the frame of the setting main body such that the board extends in the longitudinal direction of the frame, as described above, it is possible to secure a large area of the board without limits of dimension as in a case where the board is received in the setting main body. Also, since the board contacts air at the outside of the frame, the board has excellent heat dissipation efficiency. As a result, even when the lateral direction of the setting main body is decreased, heat accumulation does not occur. Consequently, it is possible to reduce the disposition space of the slide manipulation device in the lateral direction thereof.

(2) In the slide manipulation device described in Paragraph (1), the frame is provided at the lower part thereof with a first retention part and at the upper part thereof with a second retention part, and the board is provided at positions corresponding to the first retention part and the second retention part with a first engagement part and a second engagement part, the first engagement part and the second engagement part being engaged with the first retention part and the second retention part, respectively, thereby retaining the board. As the engagement parts are engaged with the retention parts, as described, it is possible to easily retain the board at the outside of the frame, thereby improving work efficiency in assembling the device.

(3) In the slide manipulation device described in Paragraph (1) or (2), a display configured to display a setting state of the parameter by the manipulator is mounted at the board, and the display has a plurality of light emitting devices to perform a displaying operation in response to the setting state of the parameter. When the display is mounted using a board configured to transmit a parameter, as described above, it is possible to display the setting state of the parameter without increasing the lateral dimension of the slide manipulation device.

(4) In place of the construction described in Paragraph (1), the slide manipulation device according to the present invention may include a setting main body having a manipulator and a frame configured to slidably support the manipulator, a circuit board configured to signalize a parameter set by the manipulator and configured to transmit the signalized parameter, and a mounting unit configured to mount the setting main body and the board to a manipulation panel of a slide control console. In this case, the mounting unit includes a planer member, an opposing part facing the inside of the manipulation panel when the mounting unit is mounted to the manipulation panel, and a panel fixing part configured to fix the planer member to the inside of the manipulation panel of the slide control console. The mounting unit retains the setting main body at one side of the planer member and the board at the other side of the planer member. Consequently, the setting main body and the circuit board are retained by the mounting unit, and therefore, the setting main body and the board are reliably fixed. The mounting unit is reliably fixed to the inside of the panel of the control console by the provision of the opposing part and the panel fixing part. As a result, the setting main body and the board are securely fixed to the panel of the control console. In particular, in a mixer including a plurality of the slide manipulation devices, it is important to reliably fix the respective slide manipulation devices in an aspect of operational stability. Also, in a case in which board grounding or electromagnetic interference (EMI) control measures are required, it is possible to reliably and easily achieve grounding or shielding of the EMI by coating metal on the mounting unit.

(5) A slide control console according to the present invention may include a plurality of the slide manipulation devices described in any one of Paragraphs (1) to (4), wherein the manipulators protrude upward from the manipulation panel, and the longitudinal parts of the frames are adjacent to one another, with the result that the slide manipulation devices are mounted to the manipulation panel while being arranged in a row. Since it is possible to reduce the disposition space of each slide manipulation device in the lateral direction thereof, as previously described, it is possible to reduce the total dimension of the slide manipulation devices.

(6) The mounting unit described in Paragraph (4) may have a bent part extending such that the bent part is bent from the manipulation panel side end of the planer member toward the parameter setting main body. The mounting unit may have an L-shaped vertical section.

(7) The bent part of the mounting unit described in Paragraph (6) may form a clamping part of which the front end extending toward the setting main body is bent in the direction away from the manipulation panel and is terminated in an engaged state at the manipulation panel side end of the setting main body.

(8) The panel fixing part described in Paragraph (4), (6), or (7) may include a first fixing piece protruding from the planer member toward the board fixing side at one end in the reciprocating direction of the manipulator and a second fixing piece protruding from the front end of the bent part toward the side opposite to the first fixing piece at the other end in the reciprocating direction of the manipulator.

According to the invention, as described above, it is possible to provide a slide manipulation device having a large circuit board area and a small disposition space in the lateral direction, and a slide control console including the slide manipulation devices.

BRIEF DESCRIPTION OF THE DRAWINGS

FIGS. 12A and 12B are views illustrating a modification of the second embodiment, wherein FIG. 12A is an exploded view illustrating a setting main body 20A and a retention member 60, and FIG. 12B is a sectional view illustrating an important part of an assembly of the setting main body and the retention member.

DETAILED DESCRIPTION OF THE INVENTION

Figure 1:
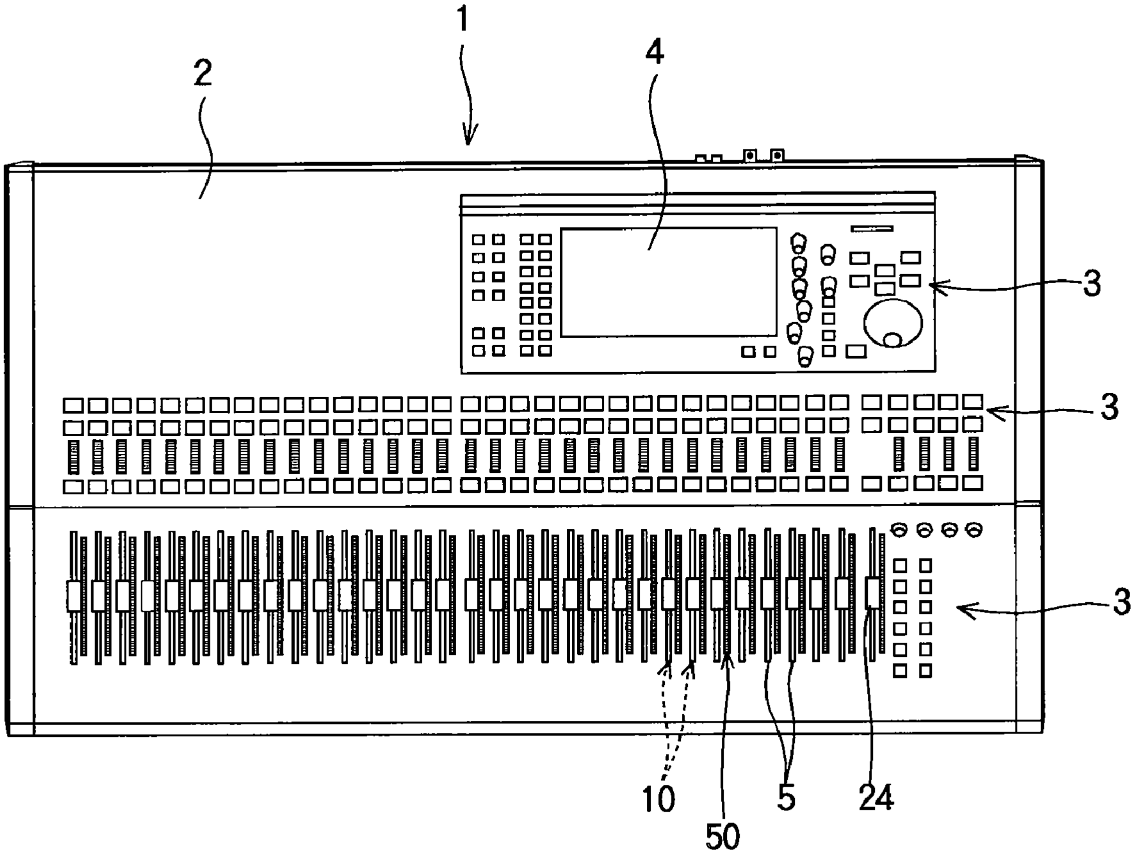
FIG. 1 is a plan view illustrating a slide control console equipped with a slide manipulation device according to a first embodiment of the present invention.

Embodiments of the present invention will now be described in detail with reference to the accompanying drawings. In the drawings, the same or similar elements are denoted by the same reference numerals, and a description thereof will not be given.

Figure 2:
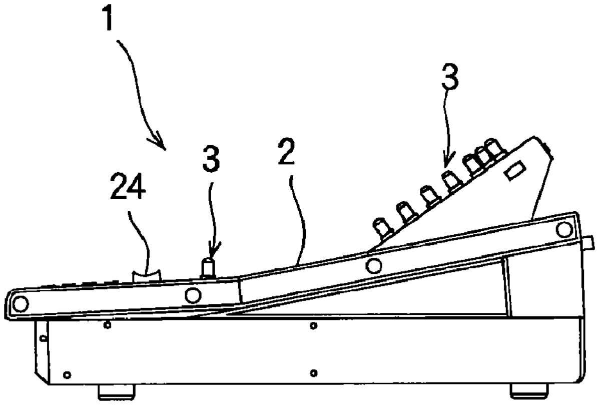
FIG. 2 is a side view of FIG. 1.

FIG. 1 is a plan view illustrating a slide control console equipped with a display device according to a first embodiment of the present invention, and FIG. 2 is a side view of FIG. 1. The slide control console 1 is used as a mixer, which is a manipulation device equipped with a light display. As shown in the drawings, a manipulation unit 3 to control various sounds and a monitor 4 are disposed at a panel 2 of the slide control console 1. In addition, a plurality of slits 5 are arranged at the panel 2. At the slide control console 1 are installed slide manipulation devices 10 corresponding to the respective slits 5. Knobs 24 are disposed at the slide control console 1 such that the knobs 24 can slide along the respective slits 5. Also, in this embodiment, displays 50 to perform luminescent display operations corresponding to the positions of the respective knobs 24 are disposed along the respective slits 5.

Figure 3:
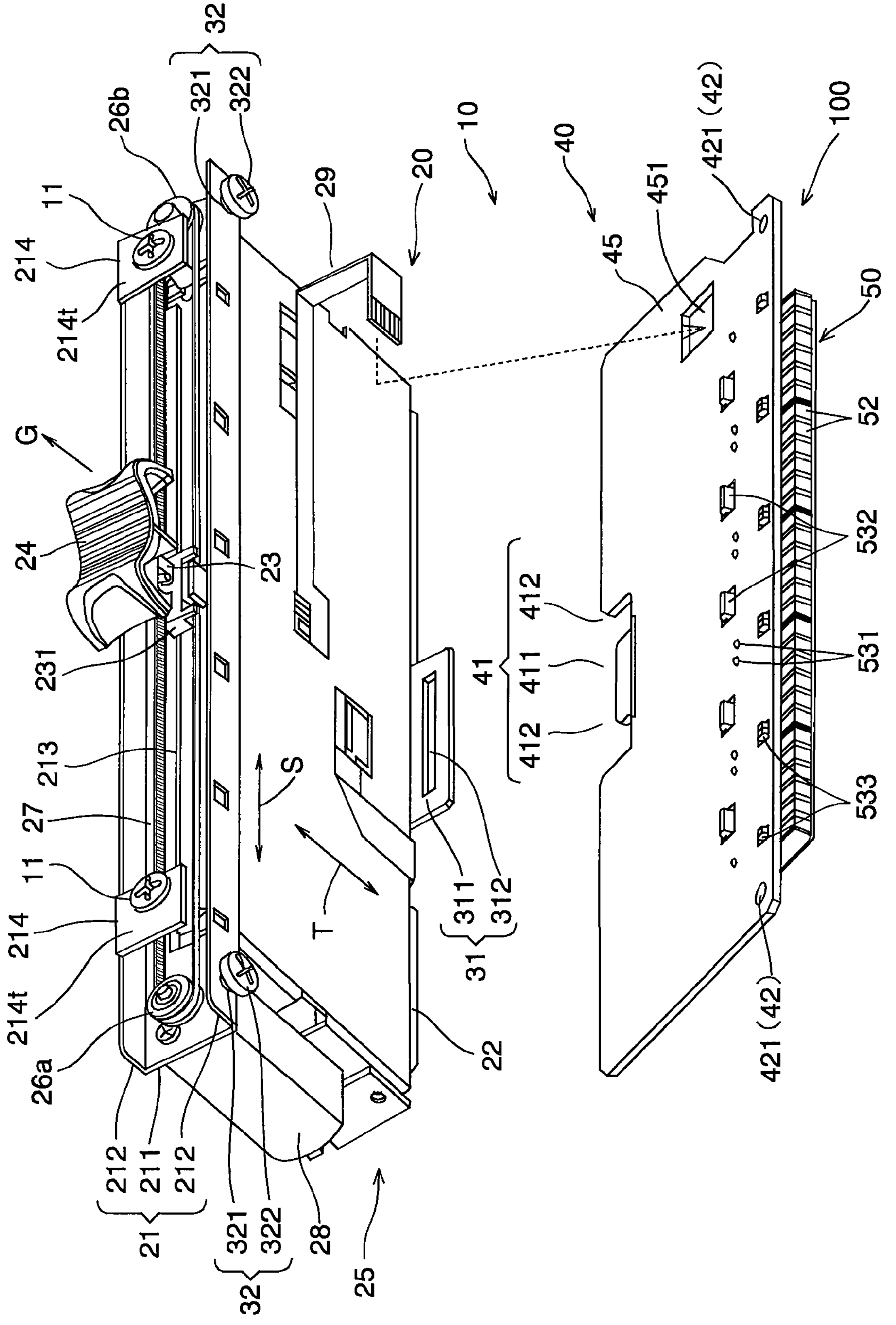
FIG. 3 is a perspective view of the slide manipulation device drawn out from FIG. 1.
Figure 4:
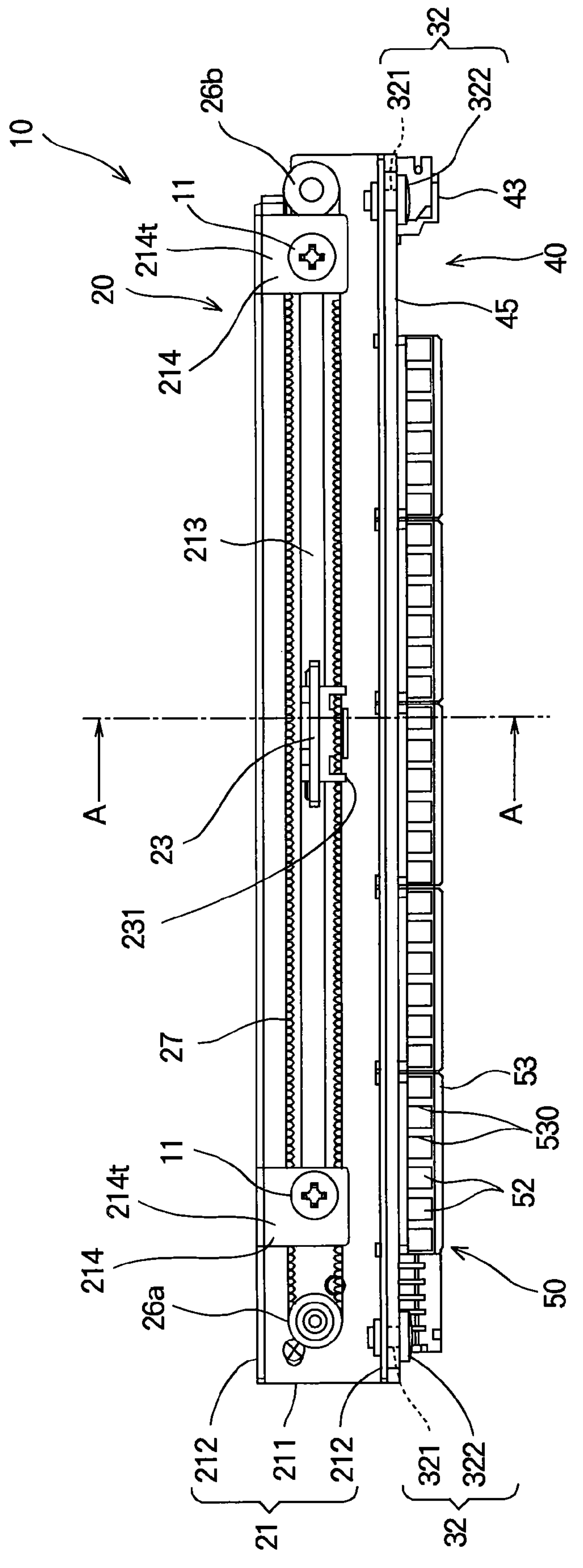
FIG. 4 is a plan view of the slide manipulation device of FIG. 3.
Figure 5:
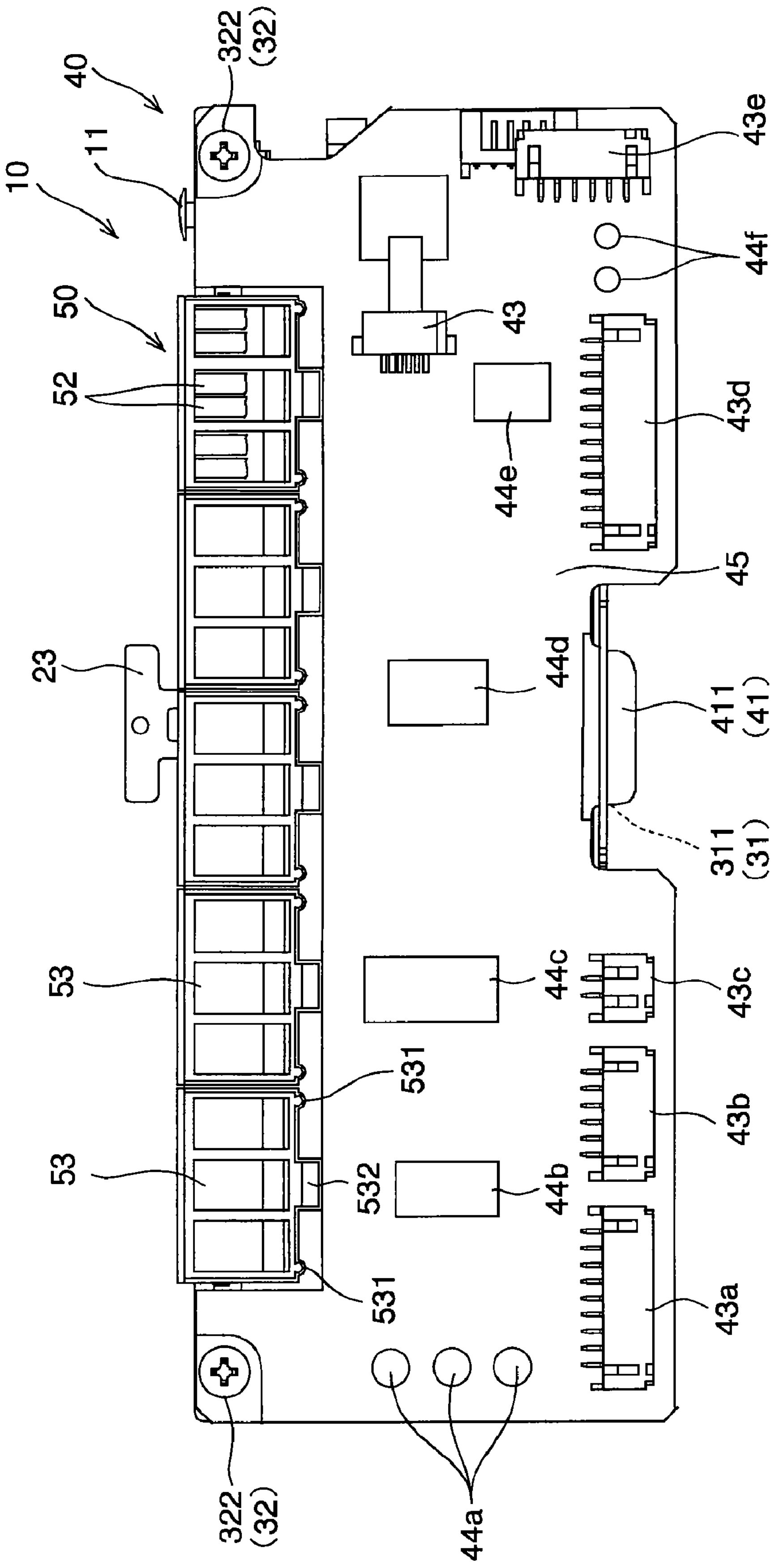
FIG. 5 is a front view of the slide manipulation device of FIG. 3.

FIGS. 3, 4, and 5 are a perspective view, a plan view, and a front view of the slide manipulation device 10, respectively. In these figures, the direction extending along a manipulation panel of the slide control console is referred to as the horizontal direction, and the direction crossing the manipulation panel is referred to as the vertical direction, for convenience of description. The slide manipulation device 10 includes a parameter setting main body 20 configured generally in a flat three-dimensional form and a board 40 having a printed circuit to signalize a parameter and to transmit the signalized parameter.

The slide manipulation device (fader) 10 is used for setting parameters of an audio mixer. The audio mixer has a control circuit composed of CPU for providing signals to a plurality of channels for setting of a desired scene (so-called scene recall) which represents a particular setting of parameters for controlling audio mixing process of respective channels. The circuit board 40 receives the signal for scene recall from each channel of the mixer, the signal indicating positional information of the manipulator corresponding to each channel. The circuit board 40 drives a motor 28 contained in the frame 25 of the parameter setting main body 20 in accordance with the received signal to automatically set the manipulator at the position specified by the received positional information. By such an operation, the plurality of the faders corresponding to the plurality of the channels are reset in response to the scene recall. On the other hand, the manipulator of a desired fader can be manually slid by an operator to input or set a value of parameter in function of a position of the manipulator. The circuit board 40 transmits the inputted positional information to the corresponding channel of the mixer to thereby set the value of the parameter of the audio mixer for each channel. In such a manner, the circuit board 40 carries out overall control of exchanging positional information of each fader between the audio mixer and the panel console.

FIG. 3 illustrates a state in which the main body 20 and the board 40 are separated from each other, and FIGS. 4 and 5 illustrates a state in which the main body 20 and the board 40 are coupled to each other. The main body 20 includes a frame 25 having an elongated upper member 21 and lower members 22 extending downward from long sides of the upper member 21. The upper member 21 includes a support wall 211 constituting an upper wall of the frame 25 and erected walls 212 extending upward from opposite sides of the support wall 211. The upper member 21 is formed in a sectional shape of an angulated U. Each of the lower members 22 is formed in a shape of a plate. The lower members 22 constitute side walls located at the sides of the frame 25 together with the erected walls 212. In this embodiment, as shown in the drawings, the frame 25 is configured such that the area of the frame 25 at each side thereof is greater than that of the frame 25 at the top thereof.

In the support wall 211 is formed an elongated opening 213, which extends in the longitudinal direction of the support wall 211. A connection rod 23 protrudes upward through the opening 213. The lower part of the connection rod 23 is coupled to a gondola (refer to FIG. 7 described later) slidably supported by the guide shaft 251 in the frame 25. To the upper part of the connection rod 23 is fixed a knob 24. The knob 24 and the connection rod 23 constitute a manipulator to manually manipulate the gondola. At one end of the frame 25 in the longitudinal direction thereof is mounted an electric motor 28. A drive shaft of the electric motor 28 extends upward such that a pulley 26*a* is fixed to the upper end of the drive shaft of the electric motor 28. Right above the support wall 211, a pulley 26*b* is rotatably supported at the end opposite to the electric motor 28. On these pulleys 26*a* and 26*b* is wound a toothed belt 27. The connection rod 23 is coupled to the toothed belt 27 via a coupling piece 231. Consequently, it is possible for the knob 24 to be slid along the opening 213 along with the gondola. The slide position of the knob 24 is detected by a position sensor disposed in the frame 25. A signal line connected to the position sensor and a signal line to control the driving of the electric motor 28 are drawn out of the frame 25 from the lower member 22 in the form of a flat cable 29. The flat cable 29 is connected to a terminal 43 disposed on a board 40. Consequently, the information of the position of the knob 24 is transmitted to a controller of the board 40 from the position sensor through the flat cable 29. A drive signal from the controller is transmitted to the electric motor 28 through the flat cable 29. As a result, it is possible to slide the knob 24 not only manually but also in a motor-driven manner. The information of the slide position of the knob 24 is transmitted to the controller of the board 40. The controller outputs control parameters, such as sound volume, sound quality, and sound effect, in response to the slide position. The output is transmitted to a control device of an electronic musical instrument or a sound facility, which performs sound control according to the control parameters.

At the frame 25 of the setting main body 20 are disposed a first retention part 31 formed at the outside of the side wall, such that the first retention part 31 protrudes outward from the lower end of the frame 25, by bending a metal sheet or integrally forming a resin and second retention parts 32 formed at the outside of one of the side walls, such that the second retention parts 32 protrude outward from the upper end of the frame 25, by bending a metal sheet or integrally forming a resin. In this embodiment, the first retention part 31 includes a locking plate 311 protruding horizontally from a central part in the longitudinal direction of the frame 25 and an elongated locking hole 312 formed in the locking plate 311. The second retention parts 32 include female-screwed holes 321 formed at opposite ends of one of the erected walls 212 in the longitudinal direction of the erected walls 212 and stop screws 322 threadedly engaged in the respective female-screwed holes 321.

At the board 40 are disposed a first engagement part 41 and second engagement parts 42, which are located at positions corresponding to the respective retention parts. In this embodiment, the board 40 is constructed in a structure in which an electronic part having a printed circuit formed thereon is mounted on a flat support plate 45. The first locking part 41 is disposed at the lower end of the support plate 45. The first engagement part 41 is formed at the central part of the lower end of the support plate 45 in a shape of a tongue-shaped piece 411. Cutouts 412 are formed at positions of the support plate 45 corresponding to opposite sides of the tongue-shaped piece 411. Consequently, the tongue-shaped piece 411 is configured in a structure in which the tongue-shaped piece 411 protrudes downward from the lower ends of the respective cutouts 412. The second engagement parts 42 are formed at opposite ends of the support plate 45 in the longitudinal direction thereof in a shape of a through-hole 421 formed in the upper part of the support plate 45.

In order to couple the main body 20 and the board 40, separated from each other as shown in FIG. 3, to each other such that the main body 20 and the board 40 are coupled to each other as shown in FIGS. 4 and 5, therefore, the tongue-shaped piece 411 of the first engagement part 41 is inserted into the locking hole 311 of the first retention part 31, the support plate 45 is placed near one of the side walls of the main body 20, the through-holes 421 of the second engagement parts 42 are aligned with the female-screwed holes 321 of the second retention parts 32, and the stop screws 322 are threadedly engaged into the female-screwed holes through the through-holes 421 from the support plate 45 side.

At one end of the support plate 45 is formed an opening 451 for wiring. When coupling the main body 20 and the board 40, therefore, it is possible to connect the flat cable 29 to the terminal 43 through the opening 451 for wiring.

Furthermore, a display 50 to display the setting state of parameters by the manipulator is mounted at the board 40. The board 40 and the display 50 constitute a display device 100 having a light emitter (light emitting element) supported on a printed wiring board.

Figure 6:
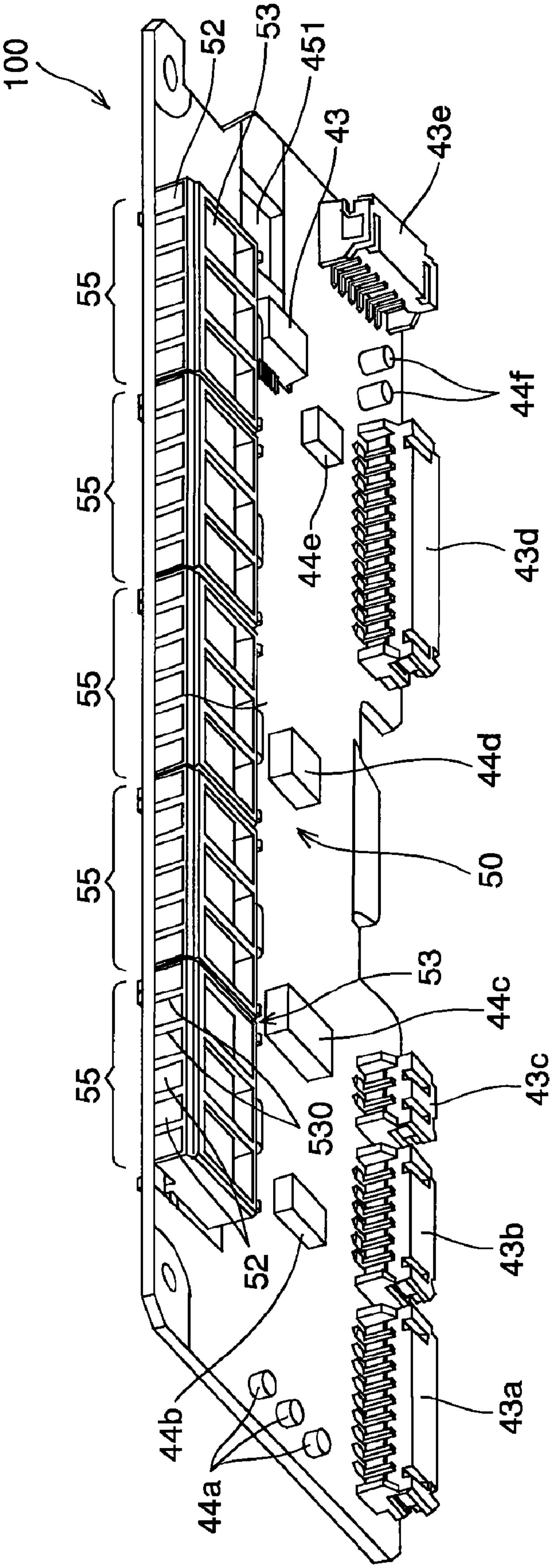
FIG. 6 is a perspective view illustrating a circuit board of the slide manipulation device of FIG. 3.
Figure 7:
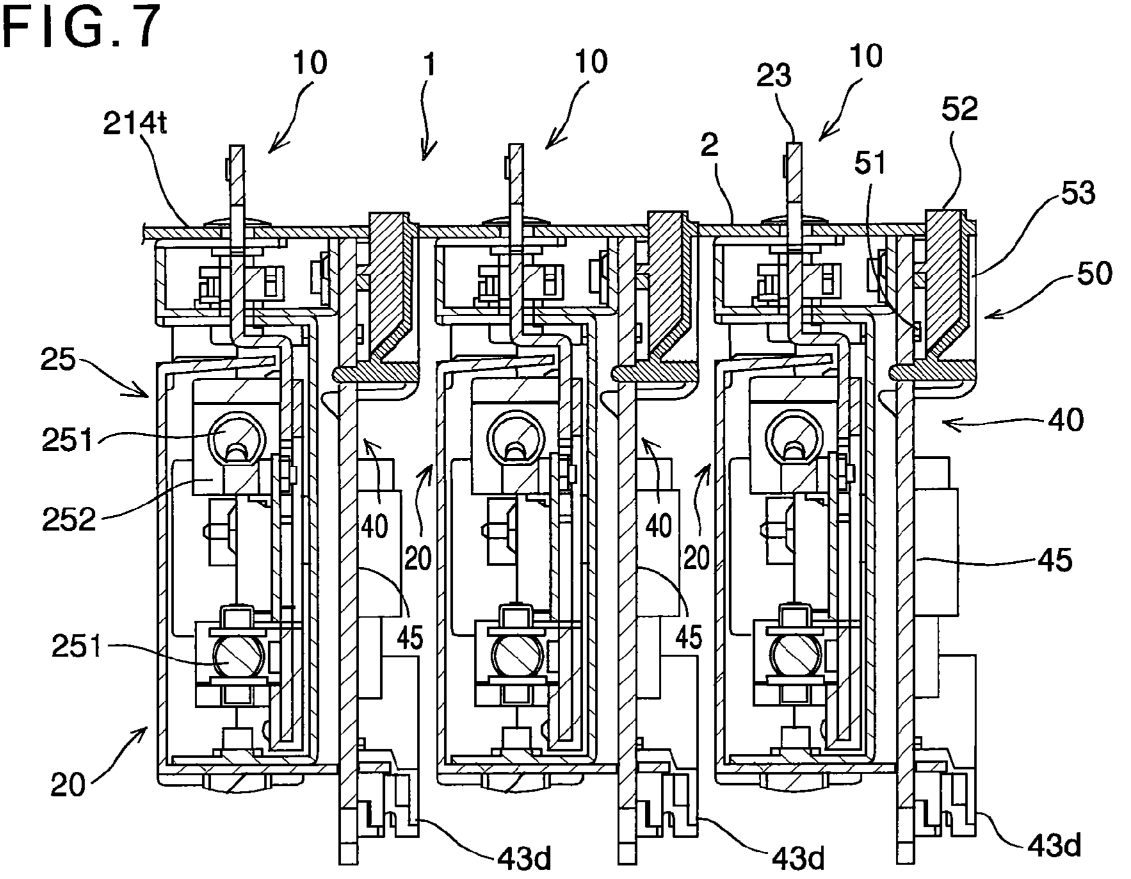
FIG. 7 is a vertical sectional side view illustrating three slide manipulation devices mounted to a panel.
Figure 8:
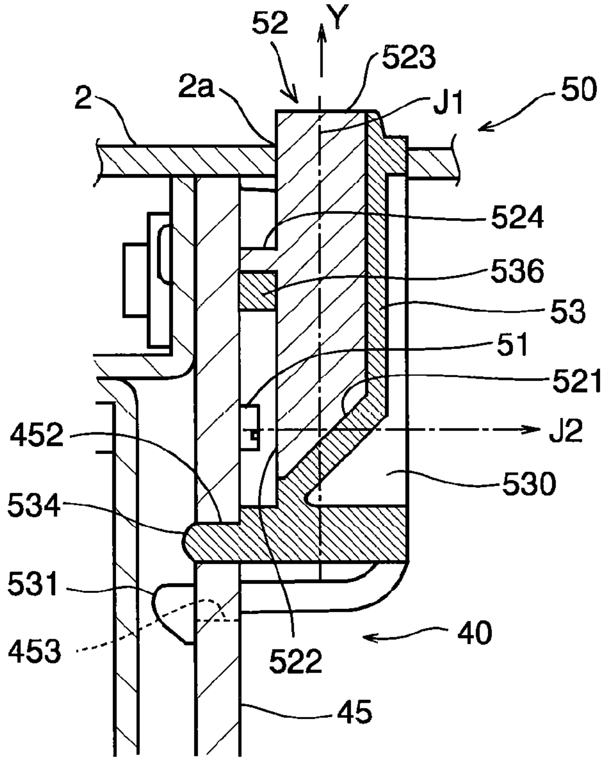
FIG. 8 is a partially enlarged view of FIG. 7, mainly illustrating a display device of the slide manipulation device.

FIG. 6 is a perspective view of the display device 100 when viewed from the side where the display 50 is disposed. FIG. 7 is a vertical sectional side view illustrating a state in which a plurality of the slide manipulation devices 10 are mounted to the panel 2 of the slide control console 1. Also, FIG. 7 is a sectional view taken along line A-A of FIG. 4 (Three slide manipulation devices 10 are illustrated in FIG. 7). FIG. 8 is an enlarged view of FIG. 7, mainly illustrating the display 50.

The display 50 includes light emitting elements 51 mounted to the support plate 45 (the previously-described board) to emit light far from the surface of the support plate 45, light guides 52 to guide the light beams emitted from the corresponding light emitting elements in a direction along the support plate 45 (in the upward direction Y1 on the board plane), and retention covers 53 to retain the corresponding light guides 52. Each of the light emitting elements 51 is a light emitting diode (LED) on a chip directly mounted to a mount surface of the board. For example, each of the light emitting elements 51 may be constructed in a structure in which the front surface of a rectangular parallelepiped having a dimension of 2×3×2 mm serves as a light emitting part (light emitting surface), the back surface of the rectangular parallelepiped serves as a terminal part. The light emitting elements 51 may be soldered on the substrate by a heating source passing by the board.

Figure 9:
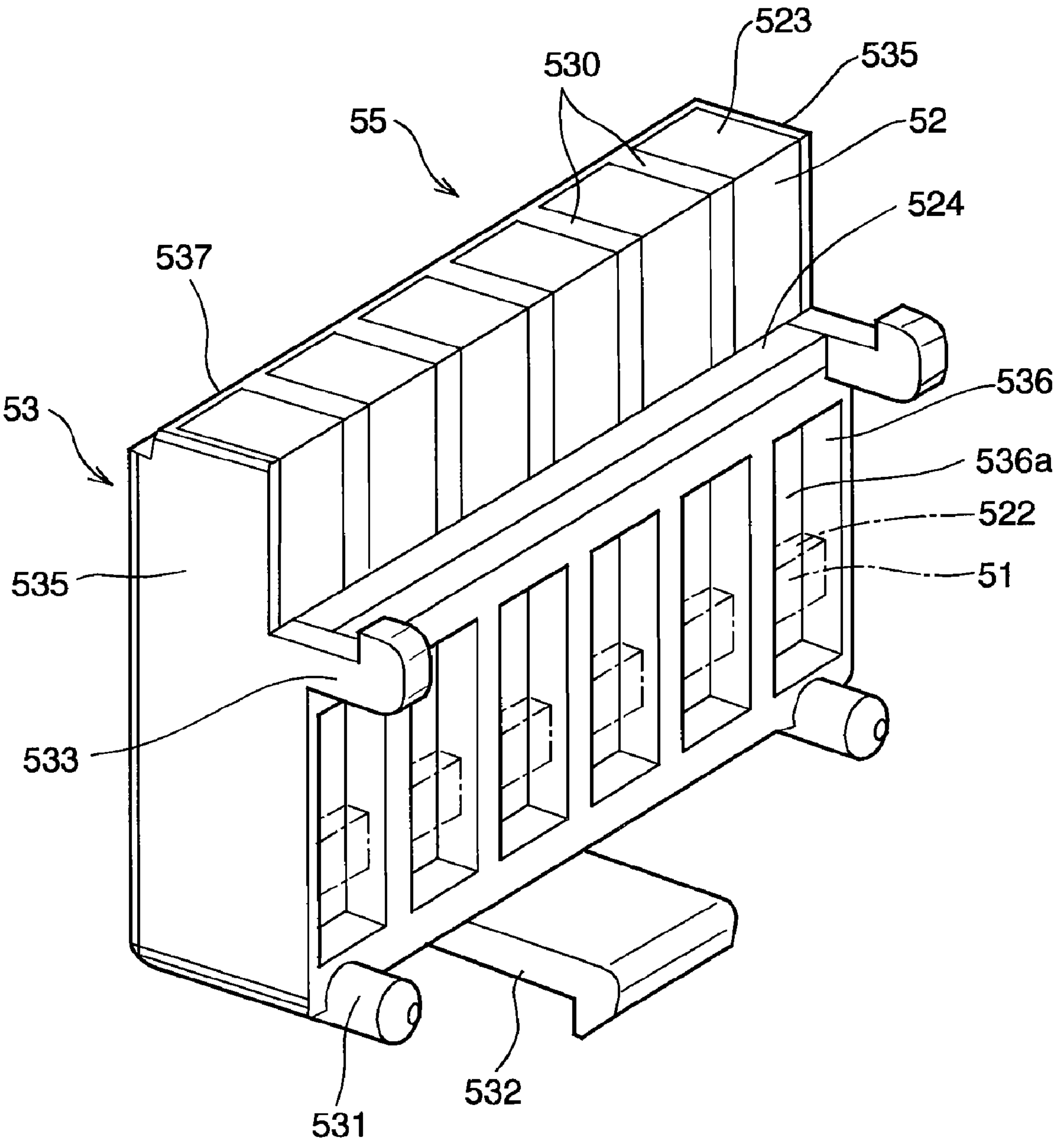
FIG. 9 is a perspective view illustrating an important part of the display device shown in FIG. 8.

As shown in FIG. 9, each of the light guides 52 is formed in a shape of a light transmitting column. A reflection surface 521 is formed at the lower end of the column such that the reflection surface 521 is inclined to an axis J1 of the column, and an incidence surface 522 is formed at the side opposite to the reflection surface 521. The incidence surface 522 is mounted to the support plate 45 such that the incidence surface 522 faces the corresponding light emitting element 51. Light incident upon the light emitting element 51 from the corresponding incidence surface 522 is reflected by the corresponding reflection surface 521, is totally reflected by the side of the column, and are then emitted through the top of the column as an emission surface 523. Consequently, each light guide 52 discharge the light, emitted from the corresponding light emitting element 51 and incident from the corresponding incidence surface 522, to the extension side of the support plate 45 (in the direction of Y1) along the support plate 45. In this embodiment, the light emitting elements 51 emit light in a direction in which an optical axis J2 is perpendicular to the surface of the support plate 45, and therefore, the light guides 52 serve to change an optical path of the incident light by 90 degrees at the reflection surfaces 521.

The light guides 52 are arranged in a structure in which six light guides 52 are arranged parallel to one another such that the light guides 52 face each other in the longitudinal direction, and the light guides 52 are coupled to a connection part 524 extending along the direction in which the light guides 52 are arranged in parallel to one another. The connection part 524 is formed as a runner at the time of integral molding using a resin.

The retention cover 53 is formed in a shape of a box having a side wall 535, a front wall 536, and a back wall 537. The retention cover 53 forms a retention part to enclose the light guides 52. The retention cover 53 includes light shielding walls 531 disposed between the neighboring light guides 52. Each of the light shielding walls 531 prevents light guided to one light guide from leaking to another light guide. At the front wall 536 are formed windows 536*a* such that the windows 536*a* are located at positions corresponding to the six light guides 52. While being mounted to the support plate 45, the light emitting parts of the light emitting elements 51 stand face to face with the corresponding windows 536*a*. The surfaces of the light guides 52 facing the corresponding light emitting elements 51 serve as the incidence surface (incidence part) 522. Also, the upper end of the front wall 536 is disposed at a position where the connection part 524 of the light guides 52 is supported by the upper end of the front wall 536 from below in an illustrated state. The six light guides 532 (light guide assembly) and the retention cover 53 are integrally formed by a two-color molding method, which is a kind of a resin molding method, to constitute a light guide unit. This molding method is disclosed in Japanese Patent No. 3603952. It is possible for the light guide unit to be formed by the two-color molding method. In this case, a light guide function (a function which prevents light emitting intensity from decreasing even when inclining the emitting surfaces of the light guides) of the light guides is remarkably improved.

In the two-color molding method, the light guide part of the light guide unit is formed as a translucency resin part, while the retention cover part of the light guide unit is formed as a light blocking effect resin part.

As resin which forms the translucency resin part, an acrylic (PMMA), polycarbonate, polystyrene (PS), AS (acrylonitrile styrene copolymer), etc. can be used. Also in these, an acrylic (PMMA) with a high light transmittance refractive index and polycarbonate are desirable. In order to make uniform the luminescence, a dispersing agent can also be added to a translucency resin part. However, in order to keep luminosity high, it is desirable to use the dispersing agent which comprises a molecule smaller than the wavelength of the light from a light source. As a dispersing agent, materials usually used are an aluminum oxide, calcium carbonate, etc.

As resin which forms the light blocking effect resin part, ABS, PE, PS, PP, PA, POM, etc. can be used. In these, ABS has a good moldability, and PS has the sufficient dimensional accuracy at the time of shaping.

The following methods can be taken in order to form an air layer between a translucency resin part and a light blocking effect resin part. First, inner one side of two resin parts, a light blocking effect resin part and a translucency resin part, is fabricated (primary shaping). It is advantageous to this to use injection molding from a point of the cost. However, compression molding can also be used. It is desirable to primarily fabricate the light blocking effect resin part from a point of the prevention from welding of the moldability.

Secondary shaping is performed by injection molding about another side of the two resin parts, where the primary molded product is incorporated. That is, by providing in a die the blank which stores a primary molded product, and performing secondary shaping, a secondary die is created and injection molding is performed so that the last gestalt of the light guide unit made of resin may be acquired. In secondary shaping, an injection speed is very important. When the injection speed is low, the primary molded product and the secondary molded product welded, welding is prevented or reduced by making an injection speed conversely higher than the speed at the time of the usual injection molding, and it is found that an air layer required for the total internal reflection in a translucency resin part is formed among both resin. The appropriate value of an injection speed changes with the state of dice such as the length of a runner and a diameter, and gates, kinds, molding temperature of resin.

In this embodiment, the retention cover 53 and the six light guides 52 constitute a display unit 55. The assembly of the display unit 55 is achieved by retaining the light guides 52 using the retention cover 53 while holding the light guides 52 coupled to one another by the connection part 524. Consequently, the assembly of the display unit 55 is easily achieved.

The retention cover 53 is provided at the lower part thereof with positioning protrusions 531 and a mounting hook 532. The retention cover 53 is provided at the upper part thereof with fixing hooks 533. The positioning protrusions 531, the mounting hook 532, and the fixing hooks 533 serve as locking parts. The support plate 45 is provided, at positions corresponding to the positioning protrusions 531, the mounting hook 532, and the fixing hooks 533, with positioning holes 452, a locking hole 453, and fixing holes 454 as counterparts for engagement. Consequently, the accurate positioning of the display unit 55 and the fixing of the retention cover 53, retaining the light guides 52, to the support plate 45 are simultaneously achieved by fixing the fixing hooks 533 to the upper part of the support plate 45 through the fixing holes 454, aligning the protrusions 531 with the positioning holes 452, aligning the hook 532 with the locking hole 453, and inserting the protrusions and the hook into the corresponding locking holes. In detail, a tip end of the fixing hook 533 is snapped into the fixing hole 454 using the elasticity of fixing hook 533. Also, it is possible to separate the display unit 55 from the support plate 45 by deforming the hook 532 to release the locked state of the hook 532 and disengaging the deformed hook 532 from the locking hole 453.

In this embodiment, as shown in FIG. 6, the retention cover 53 protrudes from the surface of the support plate 45 at the same side as the terminal 43. In addition to the above-described parts, various kinds of parts are mounted on the board 40. For example, terminals 43*a*, 43*b*, 43*c*, 43*d*, and 43*e*, and electronic parts 44*a*, 44*b*, 44*c*, 44*d*, 44*e*, and 44*f* are mounted on the board 40. The retention cover 53 and the other parts on the support plate 45 have protruding heights less than a protruding height of the terminals (for example, the terminal 43). Consequently, the display device 100 has a total height limited to the sum of the thickness of the support plate 45 and the height of the terminals. When the slide manipulation devices 10 are arranged side by side such that the neighboring slide manipulation devices 10 are adjacent to each other, therefore, it is possible to reduce distance between the neighboring slide manipulation devices 10, thereby constructing the slide control console 1 in a compact structure.

Alternatively, it is also possible to set the protruding heights of the terminals and the other parts on the support plate to be less than the protruding height of the retention cover 53 according to the height of the terminals or the retention cover 53. In this case, the display device 100 has a total height limited to the sum of the thickness of the support plate 45 and the height of the retention cover 53. Consequently, it is possible to reduce distance between the neighboring slide manipulation devices 10, thereby constructing the slide control console 1 in a compact structure.

Each of the slide manipulation devices 10 is mounted to the panel 2 of the slide control console 1 by screws 11 threadedly engaged with brackets 214 extending horizontally from the upper end of the other erected wall 212 of the upper member 21. The top of each of the brackets 214 constitutes an opposing part 214*t* facing the inside of the panel 2 when the frame 25 is mounted to the panel 2. As shown in FIG. 3, the frame 25 extends in the direction T intersecting the opposing part 214*t* and in the slide direction S of the manipulator. Consequently, the connection rod (the manipulator) 23 extends outward from the interior of the frame 25 such that the connection rod 23 is above the opposing part 214*t*. In this embodiment, the knob 24 is coupled to a place except the frame 25. At the panel 2 are formed light transmission holes 2*a* (FIG. 8) having a light transmission function, which are located at positions corresponding to the emission surfaces 523 of the respective light guides 52. Consequently, light emitted from the light guides 52 is discharged to the outside through the corresponding light transmission holes 2*a*.

At the board 40, the light emitting elements 51 of the respective displays 50 emit light in response to the positions of the knobs 24 of the respective slide manipulation devices 10 based on the information of the positions of the knobs 24. This is typically achieved in a such manner that light is emitted as a bar graph to indicate a range from the bottom to the knobs 24 as shown in FIG. 1. However, other light emitting manners may be used. For example, only a single light emitting element 51 or a plurality of light emitting elements 51 the nearest to the position where each of the knobs 24 is located may emit light.

In this embodiment, the concavo-convex engagement between the first retention part 31 and the second retention parts 32, provided at the frame 25 of the setting main body 20, and the first engagement part 41 and the second engagement parts 42, provided at the board 40, may be reversely achieved. Alternatively, it is possible to use other engagement forms for coupling therebetween. The displays 50 may be configured in various display forms that are capable of emitting light. Also, it is possible to omit the displays 50 if they are not needed.

Figure 10:
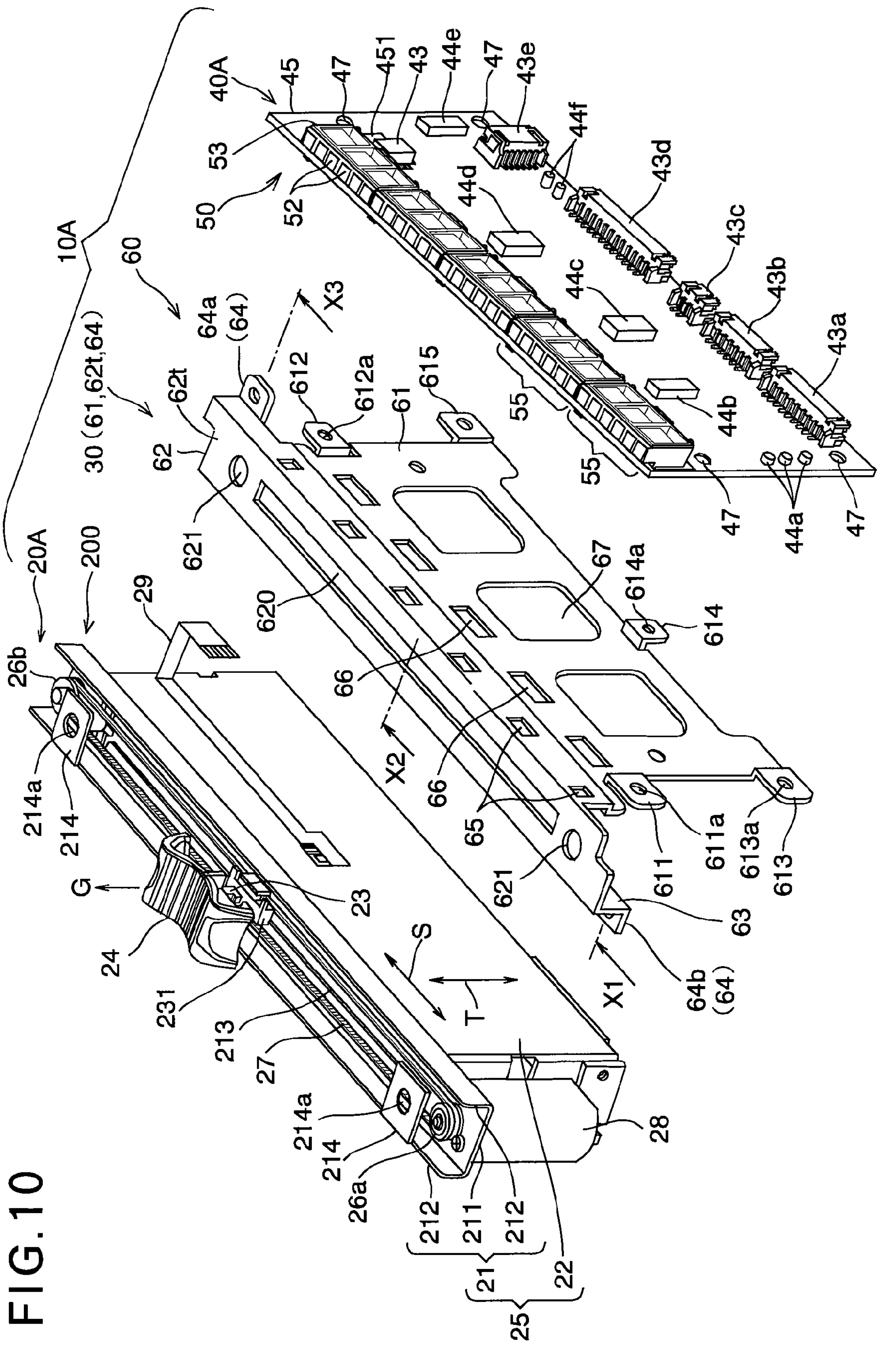
FIG. 10 is an exploded perspective view illustrating a slide manipulation device according to a second embodiment of the present invention.
Figure 11:
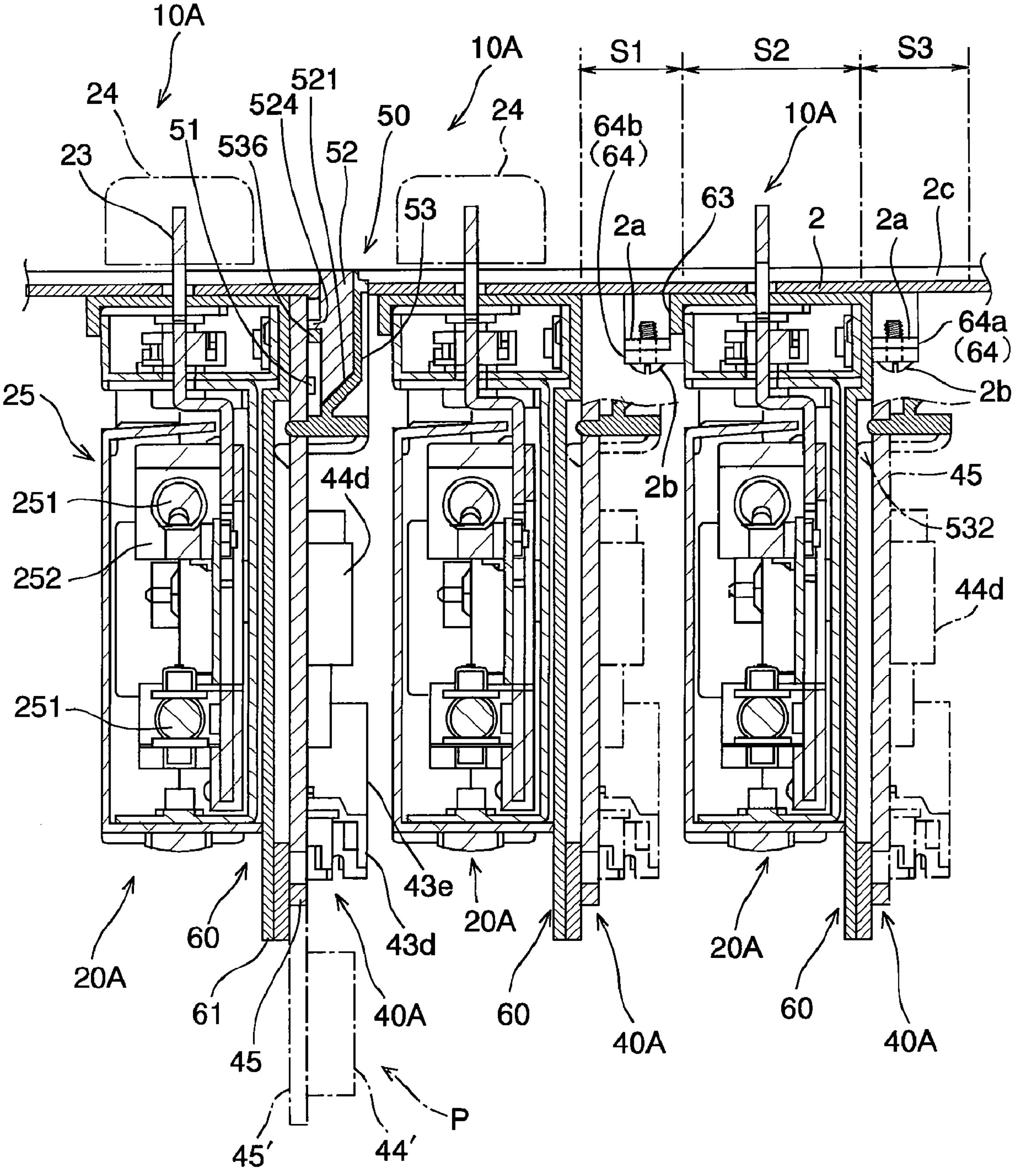
FIG. 11 is a vertical sectional side view illustrating three slide manipulation devices, one of which is shown in FIG. 10, mounted to a panel.

Hereinafter, a slide manipulation device 10A according to a second embodiment of the present invention will be described. FIG. 10 is an exploded perspective view illustrating the slide manipulation device, and FIG. 11 is a vertical sectional side view illustrating a slide control console equipped with a plurality of the slide manipulation devices. Components of the slide manipulation device according to the second embodiment identical or similar to those of the first embodiment are denoted by the same reference numerals, and a description thereof will be partially omitted. In FIGS. 10 and 11, the direction extending along a manipulation panel of the slide control console is referred to as the horizontal direction, and the direction crossing the manipulation panel is referred to as the vertical direction, for convenience of description.

The slide manipulation device 10A includes a parameter setting main body 20A and a circuit board 40A, which have the same structure as the first embodiment. In addition, the slide manipulation device 10A further includes a mounting unit 30 for fixing the setting main body 20A and the board 40A to the inside of the panel of the slide control console. Consequently, this embodiment adopts a mounting structure using the mounting unit 30, which will be described hereinafter, instead of the first retention part 31 and the second retention part 32 of the setting main body 20 and the first engagement part 41 and the second engagement parts 42 of the circuit board 40 provided in the first embodiment.

The mounting unit 30 includes a retention member 60 having a plate-shaped body (a planer member) 61 and brackets 214 mounted at the frame 25 of the setting main body 20A, as will be described hereinafter. As shown in FIG. 10, the plate-shaped body 61 is located between the parameter setting main body 20A and the board 40A. The plate-shaped body 61 has almost the same size as the parameter setting main body 20A and the board 40A. Also, the retention member 60 has a bent part 62 bent from the upper end of the plate-shaped body 61 toward the parameter setting main body 20A and extending in the horizontal direction. The retention member 60 has an L-shaped vertical section. The bent part 62 extends by almost the same distance as the thickness of the parameter setting main body 20A, and is then bent downward, such that the front end of the bent part 62 is located at a slight distance, to form a clamping part 63. The clamping part 63 is formed in a shape to clamp an upper end part 200 of the parameter setting main body 20A in cooperation with the plate-shaped body 61. At the bent part 62 is formed a slit 620 in which a knob 24 is received in a reciprocating fashion. At positions spaced apart from opposite ends of the slit 620 are formed through-holes 621 for mounting the parameter setting main body 20A. As will be described below, the bent part 62 is placed on the brackets 214, and is then mounted to the manipulation panel of the slide control console. And the top of the bent part 62 constitutes an opposing part 62*t* facing the inside (reverse side) of the manipulation panel.

At the upper part of the plate-shaped body 61 of the retention member 60 are mounted panel fixing parts 64 for fixing the retention member 60 to the panel 2 of the slide control console. The panel fixing parts 64 include a first fixing piece 64*a* protruding from the plate-shaped body 61 toward the board 40A fixing side at one end in the reciprocating direction of the knob (manipulator) 24 and a second fixing piece 64*b* protruding from the front end of the bent part 62 toward the side opposite to the first fixing piece 64*a* at the other end in the reciprocating direction of the knob 24. Both the first fixing piece 64*a* and the second fixing piece 64*b* extend horizontally, and are provided with a through-hole through which a mounting screw is inserted.

At the board mounting side of the plate-shaped body 61 are provided a plurality of tongue-shaped pieces configured to contact the surface of the board 40A. These tongue-shaped pieces include tongue-shaped pieces 611 and 612 located at opposite sides adjacent to the upper end of the plate-shaped body 61, and tongue-shaped pieces 613, 614, and 615 located at opposite sides of the lower end and at a position adjacent to the middle of the lower end of the plate-shaped body 61. These tongue-shaped pieces are formed by bending the plate-shaped body 61 such that the surfaces of the tongue-shaped pieces are stepwise raised slightly from the entire surface of the plate-shaped body 61 toward the board side. This is because it is possible to prevent the components provided at the plate-shaped body 61 side of the board 40A and ends of the components provided at the opposite side of the board 40A relative to the plate-shaped body 61 from contacting the plate-shaped body 61. Namely, there is provided a fitting part for fitting the circuit board, which has a raised portion 611 and 612 for preventing legs of the components on the circuit board from contacting with the side of the fader body. The circuit board is attached to the fader body through the raised portion 611 and 612. Except the tongue-shaped piece 615 located at one side of the lower end, the remaining tongue-shaped pieces are provided with threaded engagement holes 611*a* to 614*a* for fixing the board 40*a* to the plate-shaped body 61.

Furthermore, small cutouts 65 and 66 are formed at positions slightly below the upper end of the plate-shaped body 61 such that the cutouts 65 and 66 are arranged at predetermined intervals in the reciprocating direction of the knob 24. These cutouts 65 and 66 serve to receive the parts protruding toward the inside of the board 40 when the display unit 55 described in connection with the first embodiment is mounted to the board 40. That is, when the display unit 55 as shown in FIG. 9 is fixed to the board 40A, the positioning protrusions 531 and the fixing hooks 533 protrude toward the inside of the board 40A through the board 40A. In order to escape these protruding parts, the cutouts 65 and 66 are formed at the plate-shaped body 61 in the shape of a window at positions corresponding to the positioning protrusions 531 and the fixing hooks 533. At the middle of the plate-shaped body 61 are also formed three cutouts 67 provided to reduce the weight of the plate-shaped body 61 and to facilitate the dissipation of heat from the board.

The plate-shaped body 61, the bent part 62, and the panel fixing part 64 of the retention member 60 are formed through sheet metal working of a metal plate. Specifically, the plate-shaped body 61, the bent part 62, and the panel fixing part 64 of the retention member 60 are formed by blanking and bending a metal plate. The part below the first fixing piece 64*a* of the plate-shaped body 61 is cut out such that the first fixing piece 64*a* can be formed by the sheet metal working.

At an upper member 21 of the parameter setting main body 20A are provided horizontally-extending brackets 214 which are located adjacent to opposite sides in the reciprocating direction of the knob 24, as described in the first embodiment. A threaded engagement hole 214*a* is formed at each of the brackets 214.

In order to assemble the slide manipulation device, the bent part 62 covers the brackets 214 provided at the upper end part 200 of the parameter setting main body 20A, and the upper end part 200 is clamped by the clamping part 63 and the plate-shaped body 61. Next, screws are inserted through the through-holes 621 formed at the bent part 62, and are then threadedly engaged into the corresponding threaded engagement holes 214*a* of the brackets 214 of the upper member 21. Consequently, the parameter setting main body 20A is retained at one side of the plate-shaped body 61 by the mounting unit 30.

Subsequently, the board 40A is fixed to the plate-shaped body 61 as follows. The side opposite to the side of the board 40A where electronic components are mounted is put on the tongue-shaped pieces 611 to 615 of the plate-shaped body 61, and screws are threadedly engaged into the threaded engagement holes 611*a* to 614*a* of the tongue-shaped pieces 611 to 614 through the through-holes 47 formed at the board 40A. The lower tongue-shaped piece 615 has no threaded engagement hole. However, the fixing of the board 40A to the plate-shaped body 61 is achieved through the threaded engagement holes of the other tongue-shaped pieces. Consequently, the tongue-shaped piece 615 is in contact with the plate-shaped body 61 to perform a positioning function. That is, since the positioning protrusions 531 and the fixing hooks 533 of the respective display units 55 protrude from the inside of the board 40A, as previously described, it is possible to easily perform the positioning by putting the board 40A on the plate-shaped body 61 at a position where the protruding parts are received in the cutouts 65 and 66 of the plate-shaped body 61. Consequently, the setting main body 20A and the circuit board 40A are retained at one side and the other side of the plate-shaped body 61, respectively, by the mounting unit 30.

Subsequently, the slide manipulation device 10A is mounted to the panel 2 of the slide control console 1 using the mounting unit 30. As shown in FIG. 11, support pieces 2*a* are provided at the inside of the panel 2. The support pieces 2*a* are suspended from the inside of the panel 2 and extend in parallel to the inside of the panel 2. The support pieces 2*a* are provided at positions corresponding to the first fixing piece 64*a* and the second fixing piece 64*b*, which are previously described, of each slide manipulation device 10 to be mounted. Each of the support pieces 2*a* is provided with a threaded engagement hole. Three slide manipulation devices 10 are shown in FIG. 11. For the right-side two slide manipulation devices, upper regions S1, S2, and S3 of the slide control console are illustrated to have different sections to clearly show the support pieces 2*a*, the first fixing piece 64*a*, and the second fixing piece 64*b*. The positions of the sections of the regions S1, S2, and S3 are shown as X1, X2, and X3 at the retention member 60 of FIG. 10, respectively. In FIG. 11, the boards 40A are shown by a dashed dotted line while the upper parts of the respective boards 40A are cutaway. The left-side two knobs 24 are shown by a dashed dotted line, and the right-side one is not shown.

The support pieces 2*a* are disposed such that, when the bent part 62 of the retention member 60 comes into contact with the inside of the panel 2, the support pieces 2*a* come into contact with or are located adjacent to the first fixing piece 64*a* and the second fixing piece 64*b*. Consequently, it is possible to fix the slide manipulation device 10 to the panel 2 by putting the bent part 62 of the retention member on the inside of the panel 2, putting the first fixing piece 64*a* and the second fixing piece 64*b* on the respective support pieces 2*a*, and threadedly engaging the mounting screws 2*b* into the threaded engagement holes of the respective support pieces 2*a* through the through-holes formed at the respective fixing pieces, whereby it is possible to reliably fix the mounting unit 30 to the inside of the panel 2. As a result, the setting main body 20A and the circuit board 40A are securely fixed to the panel 2 via the mounting unit 30.

It is possible to perform the mounting work at the inside of the panel 2. For example, two panels may be placed vertically in opposite directions, and a series of processes from a process for positioning the slide manipulation device 10 at the slit of the panel 2 to a process for fixing the slide manipulation device 10 to the panel 2 may be performed at the inside of the panel 2. Consequently, the workability is remarkably excellent. Also, it is possible to obtain an advantage in that the mounting screws are not shown from the surface of the panel.

In this embodiment, a resin sheet 2*c* is coated on the surface of the panel 2. It is possible for the sheet 2*c* to provide durability and a decorative feature to the panel surface. Also, it is possible to prevent the screws from protruding from the manipulation panel surface by restricting the protruding height of the heads of the screws threadedly engaged in the threaded engagement holes 214*a* through the through-holes 621 from the panel 2 to be less than the thickness of the sheet 2*c*. In particular, it is possible to make the surface of the manipulation panel smooth by setting the protruding height of the screw heads from the panel 2 to be the same as the thickness of the sheet and forming holes having the same diameter as the screw heads at the sheet 2*c*.

Although the embodiments of the present invention have been disclosed as described above, the present invention is not limited to the above-described embodiments but may be variously modified without departing from the gist of the invention.

In the second embodiment, the bent part 62 and the clamping part 63 of the retention member 60 continuously extend in the reciprocating direction of the knob 24. Alternatively, the bent part 62 and the clamping part 63 of the retention member 60 may extend intermittently at intervals in the reciprocating direction of the knob 24. However, when the bent part 62 is configured in a continuously extending shape, it is possible to increase the strength of the retention member 60. Also, when the clamping part 63 is configured in a continuously extending shape, it is possible to further increase the strength of the retention member 60.

Also, in the second embodiment, the first fixing piece 64*a* and the second fixing piece 64*b* are provided at one side and the other side of the retention member 60 in the reciprocating direction of the knob 24, such that the first fixing piece 64*a* and the second fixing piece 64*b* protrude in opposite directions, whereby the fixing pieces are disposed in a staggered fashion. Alternatively, the fixing pieces may be provided at one side and/or the other side of the retention member 60 such that the fixing pieces protrude in opposite directions. However, when a plurality of the slide manipulation devices are mounted to the panel 2, it is possible to closely arrange the retention members 60 and thus the slide manipulation devices 10 and 10 without the interference between the fixing pieces of the neighboring retention members 60 by the staggered arrangement (zigzag arrangement) of the fixing pieces. In the same aspect, when the fixing pieces are provided at one side and/or the other side in the reciprocating direction of the knob 24 such that the fixing pieces protrude in opposite directions, it is preferable to locate the fixing pieces at positions where the interference between the fixing pieces of the neighboring retention members 60 is prevented.

Figure 12A:
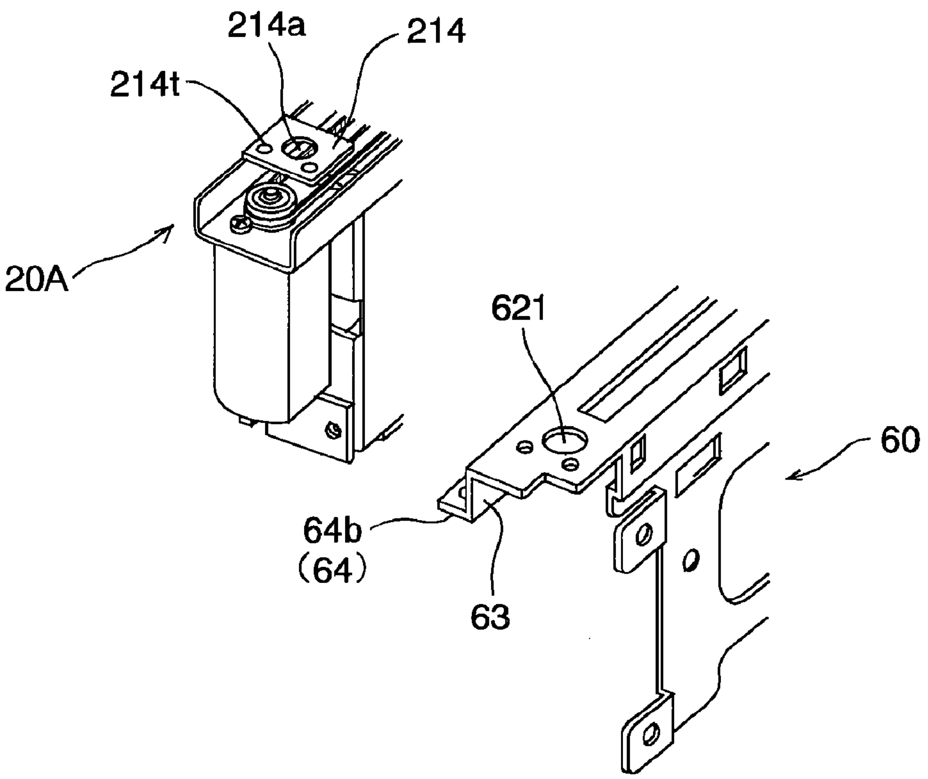
Figure 12B:
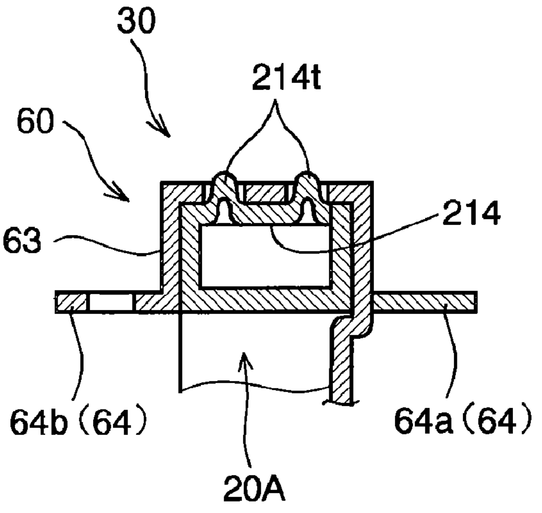

The opposing part facing the inside of the panel 2 may be formed in a shape shown in FIGS. 12A and 12B. In this example, protrusions 214*b*, extending upward from the top of the bracket 214, slightly protrude upward from the bent part 62 through the hole 62*b* formed at the bent part 62. Consequently, opposing part 214*t* is formed by these protrusions 214*b*.

Figure 13:
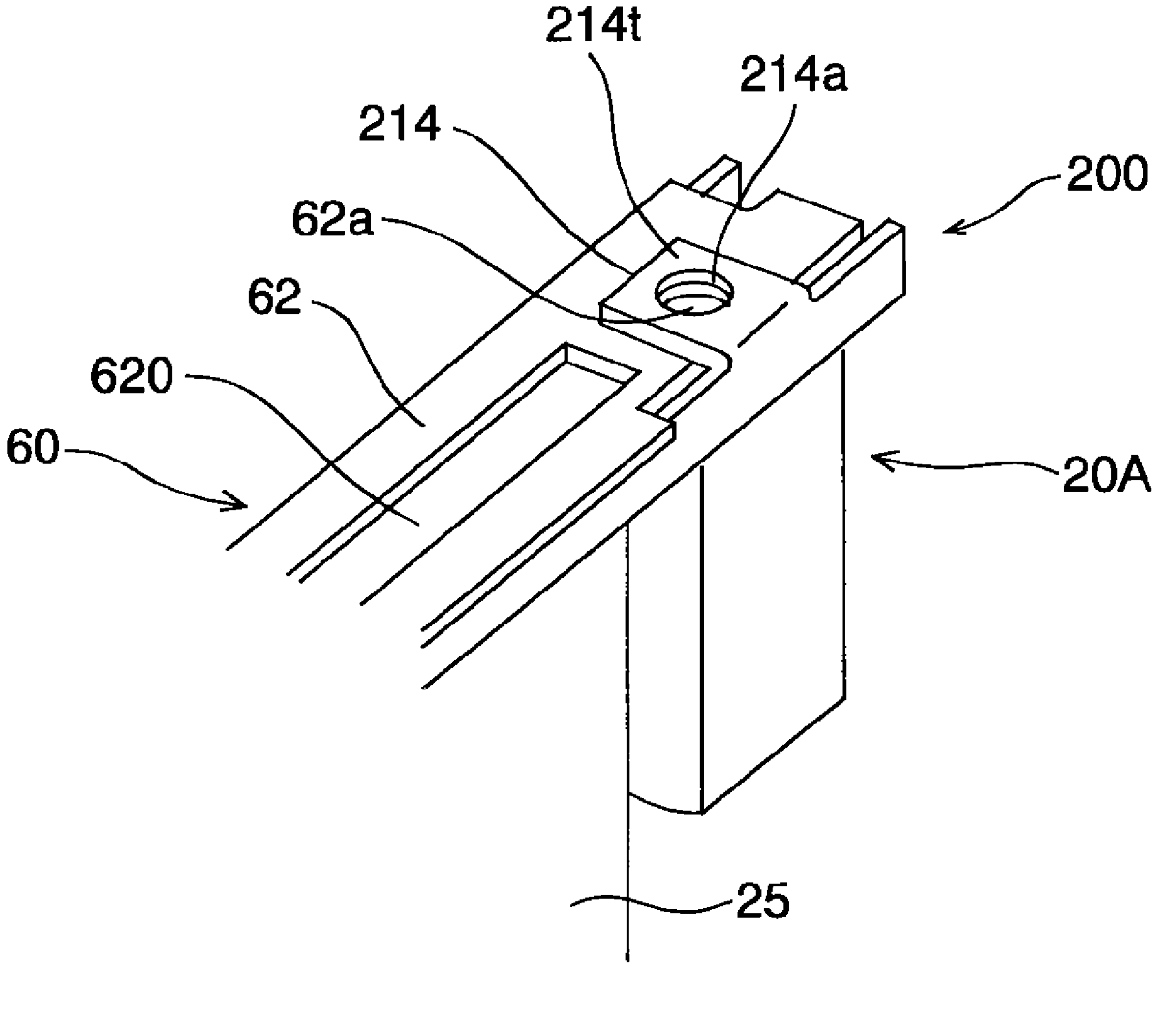
FIG. 13 is a perspective view illustrating another modification of the second embodiment.

In the second embodiment, when the slide manipulation device 10 is mounted to the panel 2 by the mounting unit 30, the bent part 62 covers the brackets 214 from above. Alternatively, as shown in FIG. 13, the bracket 214 may be located above the bent part 62. In this case, the top 214*t* of the bracket 214 becomes the opposing part facing the panel 2. In this structure, the bent part 62 is configured to be inserted below the bracket 214 by removing the clamping part 63, as shown in the drawing. Also, in order to achieve easy insertion of the bent part 62, it is preferable for the connection rod 23 not to protrude outward from the interior of the frame 25. In this case, the knob 24 extends into the frame 25 such that the knob 24 is coupled to the connection rod 23. The mounting of the slide manipulation device 10 to the panel 2 is achieved by providing a fixing piece configured in the same shape as the second fixing piece 64*b* located at one side of the clamping part 63 shown in FIG. 10 in the slide direction of the knob at the other side of the clamping part 63 in the slide direction and using these fixing pieces.

Furthermore, in the mounting unit 30 of the second embodiment, the panel fixing part may be constituted by the opposing parts 62*t* (FIG. 10) and 214*t* (FIG. 13) having the mounting holes such that screws are fixedly inserted through the holes of the panel 2 and the holes formed at the bent part 62 and the brackets 214. In this case, at least one of the panel fixing parts 64 (the first fixing piece 62*a* and the second fixing piece 62*b*) shown in FIGS. 10 and 11 may be omitted.

Also, as indicated by the dash and dot line at the lower part of FIG. 11, the support plate retained at the planer member 61 of the mounting unit 30 may be extended to a position shown as a support plate 45' in the direction away from the panel 2, and an electronic component 44' may be mounted on the extended region to form an additional board P. This additional board may have a function to control the other slide manipulation devices and control devices of the slide control console. In this case, it is possible to reduce the number of components as compared with the case in which an additional board to perform the same function is mounted. Consequently, it is also possible to obtain an advantage of increasing the degree of freedom in circuit design of the board by extending the support plate above the region necessary to retain the setting main body.

The slide manipulation device shown in the above-described respective embodiments is configured in a structure in which the manipulation panel is almost horizontally disposed. Alternatively, some or all of the manipulation panel may be disposed at a large incline angle to the horizontal plane or almost vertically disposed. The present invention is applicable irrespective of the disposition direction. When the structure shown in each embodiment as described above is modified from the horizontal structure to a steep incline structure, it is required to interpret the upper side of the slide manipulation device as the side adjacent to the manipulation panel and the lower side of the slide manipulation device as the side remote from the manipulation panel in the description of the embodiments.

What is claimed is:

1. A slide manipulation device mountable in a manipulator panel, comprising:
- a manipulator;
- a frame configured to slidably support the manipulator; and
- a circuit board,
- wherein the frame has an opposing part facing the inside of the manipulation panel when the frame is mounted to the manipulation panel, the frame extending in a direction intersecting the opposing part and extending in a slide direction of the manipulator, the manipulator extends outward from the interior of the frame, and is slidable in the slide direction to indicate a parameter for use in an electronic equipment, and the circuit board is disposed at the outside of the frame along the extending direction of the frame, and is mounted to the frame for carrying out overall control to signalize a parameter set by the manipulator and to transmit the signalized parameter to the electronic equipment, and otherwise to receive the parameter from the electronic equipment and to slide the manipulator in response to the received parameter.

2. The slide manipulation device according to claim 1, wherein the frame is provided at a lower part thereof with a first retention part and at an upper part thereof with a second retention part, and the circuit board is provided at positions corresponding to the first retention part and the second retention part with a first engagement part and a second engagement part, respectively, the first engagement part and the second engagement part being engaged with the first retention part and the second retention part, respectively, thereby retaining the circuit board.

3. The slide manipulation device according to claim 1, further comprising a display mounted on the circuit board to display a setting state of the parameter set by the manipulator,
- wherein the display has a plurality of light emitting elements to perform a displaying operation in response to the setting state of the parameter.

4. The slide manipulation device of claim 1, further comprising:
- a mounting unit configured to mount a setting main body including the manipulator and the frame and the circuit board to the manipulation panel of the slide control console,
- wherein the mounting unit comprises a planer member, an opposing part facing the inside of the manipulation panel when the mounting unit is mounted to the manipulation panel, and a fixing part configured to fix the planer member to the inside of the manipulation panel of the slide control console, the setting main body extends in a direction intersecting the opposing part and in a slide direction of the manipulator, the manipulator extends outward from the interior of the frame, and the mounting unit retains the setting main body at one side of the planer member and retains the circuit board at the other side of the planer member.

5. The slide manipulation device according to claim 4, wherein the mounting unit comprises an integral assembly that is formed by integrally molding the planer member, the opposing part and the fixing part with each other.

6. The slide manipulation device according to claim 4, wherein the opposing part and the fixing part are not arranged in a same plane such that the fixing part is positioned inside relative to the opposing part.

7. The side manipulation device of claim 1, wherein the side manipulation device is a fader apparatus for use in an audio mixer, the fader apparatus comprising:

a fader main body having the manipulator for indicating setting parameter information associated to a sliding movement of the manipulator; and a mount unit that mounts the fader main body to a panel of the audio mixer;

wherein the circuit board carries out overall control of transmitting and receiving signals to and from an electronic equipment including the audio mixer for exchanging the setting parameter information;

wherein the fader main body, the mount unit and the circuit board are integrally assembled into an assembly; and wherein the mount unit has a fitting part facing the panel for mounting the circuit body to the mount unit vertically with the fitting part.

8. A slide control console comprising:

a manipulation panel; and a plurality of slide manipulation devices mounted to the manipulation panel while being arranged in a row, wherein each slide manipulation device comprises:

a manipulator;

a frame configured to slidably support the manipulator; and a circuit board, wherein the frame has an opposing part facing the inside of the manipulation panel when the frame is mounted to the manipulation panel, the frame extending in a direction intersecting the opposing part and extending in a slide direction of the manipulator, the manipulator extends outward from the interior of the frame, and is slidable in the slide direction to indicate a parameter for use in an electronic equipment, and the circuit board is disposed at the outside of the frame along the extending direction of the frame, and is mounted to the frame for carrying out overall control to signalize a parameter set by the manipulator and to transmit the signalized parameter to the electronic equipment, and otherwise to receive the parameter from the electronic equipment and to slide the manipulator in response to the received parameter.

9. The slide control console of claim 8, wherein each slide manipulation device further comprises:

a setting main body having the manipulator and the frame configured to slidably support the manipulator; and a mounting unit configured to mount the setting main body and the circuit board to the manipulation panel of the slide control console, wherein the mounting unit comprises a planer member, an opposing part facing the inside of the manipulation panel when the mounting unit is mounted to the manipulation panel, and a fixing part configured to fix the planer member to the inside of the manipulation panel, the setting main body extends in a direction intersecting the opposing part and in a slide direction of the manipulator, the manipulator extends outward from the interior of the frame, and the mounting unit retains the setting main body at one side of the planer member and retains the circuit board at the other side of the planer member.

* * * * *